United States Patent [19]

Rogozhin et al.

[11] 4,119,619

[45] Oct. 10, 1978

[54] EMULSIFICATION METHOD FOR THE PROCESSING OF KRIEL TO PRODUCE PROTEIN, LIPIDS AND CHITIN

[76] Inventors: Sergei Vasilievich Rogozhin, ulitsa Vavilova, 55/5, kv. 20; Efim Semenovich Vainerman, ulitsa Profsojuznaya, 94/20, kv. 53; Ljubov Mikhailovna Burmistrova, ulitsa Preobrazhensky val, 16, kv. 44; Jury Alexandrovich Davidovich, ulitsa Krasny Kazanets, 19, korpus 2, kv. 131; Vladimir Jurievich Ryashentsev, ulitsa Musy Dzhalilya, 34, korpus 2, kv. 230; Valentina Kirillovna Kulakova, ulitsa Kedrova, 13, korpus 2, kv. 72; Lev Lvovich Lagunov, ulitsa Trifonovskaya, 47a, kv. 47; Vladimir Petrovich Bykov, ulitsa Chertanovskaya, 1a, korpus 1, kv. 84, all of Moscow, U.S.S.R.

[21] Appl. No.: 858,801

[22] Filed: Dec. 8, 1977

[30] Foreign Application Priority Data

Dec. 16, 1976 [SU] U.S.S.R. ............................. 2432584

[51] Int. Cl.² ........................... A23J 1/04; A23K 1/10
[52] U.S. Cl. .................... 260/112 R; 536/20; 260/412; 260/412.8
[58] Field of Search ................ 260/112 R, 412, 412.8

[56] References Cited

U.S. PATENT DOCUMENTS

| 2,875,061 | 2/1959 | Vogel et al. ...................... 260/112 R |
| 3,164,471 | 1/1965 | Whaley et al. .................. 260/112 R |
| 3,252,962 | 5/1966 | Whaley et al. .................. 260/112 R |
| 3,598,606 | 8/1971 | Spinelli ............................ 260/112 R |
| 3,798,126 | 3/1974 | Gasser et al. ..................... 260/112 R |
| 3,862,122 | 1/1975 | Peniston et al. .................. 260/112 R |

OTHER PUBLICATIONS

J. Sci. Food AG., 1970, 21(6), pp. 293–296, Sidhu et al.
Chem. Abstracts, vol. 74, 1971, 98509y, Kryuchkova.
Chem. Abstracts, vol. 74, 1971, 110570w, Lagunov et al.
Chem. Abstracts, vol. 85, 1976, 31716x, Gulyaev et al.

*Primary Examiner*—Howard E. Schain
*Attorney, Agent, or Firm*—Steinberg & Blake

[57] ABSTRACT

The method for the processing of kriel to produce protein, lipids and chitin comprises emulsification of lipids by intensively stirring kriel in an aqueous medium. The resultant emulsion of lipids is separated from the kriel mass and from the kriel mass proteins are extracted at a pH of 10 to 12. The alkaline extract of proteins is separated from chitin integuments and protein is separated therefrom.

3 Claims, No Drawings

EMULSIFICATION METHOD FOR THE PROCESSING OF KRIEL TO PRODUCE PROTEIN, LIPIDS AND CHITIN

FIELD OF APPLICATION

The present invention relates to methods for the processing of kriel to produce protein, lipids and chitin. Kriel is a prospective source of food protein and other practically useful products such a chitin and lipids which find wide application in different branches of the national economy — the food industry, textile and paint and varnish industry, in agriculture and medicine.

BACKGROUND OF THE INVENTION

Known in the art is a method for the production of a proteinaceous nutritive substance from kriel residing in comminuting and pressing fresh or frozen and then defrosted kriel. The liquid separated during pressing is heated for 10 to 15 minutes at a temperature of 90° to 95° C. for coagulation of proteins contained therein. The proteinaceous coagulate is separated from the broth by filtration or centrifugation to produce a mass which is used in the U.S.S.R. under a trade name of the Okean protein paste.

A disadvantage of said method for the processing of kriel is loss of nutritive substances, particularly protein, and an insufficiently full utilization of other components of kriel. The broth containing a considerable amount of nutritive substances is not processed and is poured off. The yield of protein is 35 to 40%. It should be pointed out that the Okean paste is a perishable product and should be stored only when frozen at a temperature not exceeding −18° C. for not more than 12 to 14 months. The thermally denatured protein contained in the Okean paste possesses low functional properties (foam-forming and gel-forming properties, a water-holding capacity, etc.) which makes its processing and use difficult. The cake formed after pressing comprising a portion of the starting proteins, lipids and chitin integuments can at present be processed and used only as feed meal.

Known in the art is a method for the production of a protein concentrate from frozen kriel kept at a temperature of −20° comprising defrostation, communution of kriel, extraction with isopropanol with subsequent removal of the solvent, and drying under vacuum at 70° C.

Using the present method a proteinaceous concentrate is produced with a content of protein of 710 to 775%, lipids of 0.3%, and chitin of 5.8 to 6.4% (as calculated for dry substance). Said method has the following disadvantages. The use of organic solvent makes the production more difficult. In addition, the solvent itself and the process for the removal thereof may deteriorate the quality of the protein. The proteinaceous concentrate has a comparatively low content of protein and a high chitin content (Sidhy G.S., Montgomery W.A., Holloway G.L., *Biochemical and Nutritive Value of Kriel, J. Sci. Food Agric.*, 1970, 21, No.6,293–296).

OBJECT OF THE INVENTION

It is an object of the present invention to develop such a method for the processing of kriel which would make it possible to produce protein, lipids and chitin with a high yield and quality.

BRIEF DESCRIPTION OF THE INVENTION

The method for the processing kriel to produce protein, lipids and chitin, according to the invention, is characterized in comprising emulsification of lipids of kriel in an aqueous medium; separation of the emulsion of lipids from the kriel mass; alkaline extraction of proteins from the kriel mass at a pH of 10 to 12; separation of the protein extract produced from chitin integuments; separation of protein from the protein extract.

The invention makes it possible to obtain a protein product with a content of protein of up to 95% by weight as calculated for dry substance.

DETAILED DESCRIPTION OF THE INVENTION

According to the invention, the first stage of the processing of kriel provides for extraction of lipids. This extraction of lipids is effected by emulsification using various techniques such as intensive stirring in an apparatus with a stirrer, or an ultrasonic method. Used as a medium in which emulsification is conducted is water or aqueous solutions of salts. To reduce losses of protein in the process of emulsification the pH of the emulsifying medium should be maintained within 4.5 to 5.0. In emulsification lipids are separated with a yield of up to 95% by weight.

The kriel after separation of lipids therefrom is treated with an alkaline solution with a pH of 10 to 12 for extraction of proteins therefrom. A two-phase system is formed comprising an aqueous-alkaline solution containing protein, and a solid residue containing chitin integuments and other insoluble substances. The aqueous-alkaline solution containing protein is separated from the solid residue by filtration or centrifugation. Protein is separated from the resultant aqueous-alkaline solution by various methods, for example, by precipitation with alcohol or ultrafiltration, precipitation in the isoelectric point, or thermal coagulation. The isoelectric precipitation is carried out by food acids at a pH of 4 to 5. A curdled, easily settling precipitate of protein is formed which is separated and washed with 2 to 5 volumes of water. The washed precipitate is dried. As a result a product is obtained with a protein content of up to 95% by weight as calculated for dry substance.

Thus, the proposed method for the processing of kriel makes it possible to produce such valuable substances as protein, lipids and chitin.

The simple technology and the availability of the reactants used make the process commercially profitable. For a better understanding of the present invention examples are presented below.

EXAMPLE 1

In an apparatus with a capacity of 10 l provided with a stirrer there is placed 1 kg of kriel which is filled with water and stirred at 1,000 rpm for 0.3 hour. The resultant emulsion of lipids is separated from the kriel mass by filtration through a stainless steel screen having a mesh size of 1×1 mm. The kriel mass is transferred to the vessel with a stirrer into which there is added 3 l of an aqueous solution of NaOH of such a concentration as to reach a pH of the mixture of 10 and stirred for half an hour. When kriel is treated with alkali extraction of proteins takes place. The resultant extract of proteins is separated from the insoluble residue of chitin integuments by filtration through a metal screen with a mesh size of 1×1 mm and centrifuged at 25,000 rpm for 0.15 hour to remove impurities. To the purified extract of proteins there is added while stirring a 1-mole solution of HCl to reach a pH of 4.5, protein being precipitated. The precipitate is left to settle for 3 hours, thereafter it is separated from the liquid, washed with 3 liters of water and dried lyophilically. The protein product obtained in an amount of 50 g is a pale-pink odorless powder, having a moisture content of 10% by weight and comprising 85% by weight of protein and 2% by weight of lipids.

The residue of kriel produced after separation of the extract of proteins is pressed to remove moisture and dried to produce 17 g of chitin integuments.

EXAMPLE 2

The processing of kriel is carried out in the same manner as in Example 1, except that emulsification of lipids is conducted in a 0.15 mole aqueous solution of sodium chloride at a pH of 4.5. The protein product obtained in an amount of 54 g has a moisture content of 12% and comprises 80% by weight of protein and 3% by weight of lipids, and 20 g of chitin integuments.

EXAMPLE 3

The processing of kriel is conducted in the same manner as in Example 1, except that emulsification of lipids is carried out for half an hour, and protein is precipitated from the alkaline extract by adding thereto a 1 mole solution of acetic acid. The resultant protein precipitate is washed with 5 volumes of water to produce 60 g of a protein product having a moisture content of 8% and comprising 85% by weight of protein, 5% by weight of lipids and 18 g of chitin integuments.

EXAMPLE 4

The processing of kriel is carried out in the same manner as in Example 1, except that precipitation of protein from the alkaline extract is conducted by adding thereto a 0.8 mole solution of sulfuric acid. The resultant precipitate of protein is washed with 3 volumes of water to produce 54 g of a protein product having a moisture content of 11% and comprising 80% by weight of protein and 5% by weight of lipids, and 24 g of chitin integuments.

EXAMPLE 5

The processing of kriel is conducted in the same manner as Example 1, except that emulsification of lipids is conducted in an aqueous solution of salts — 0.2 mole of NaCl; 0.03 mole of $MgCl_2$; 0.01 mole of $MgSO_4$; and 0.005 mole of $CaSO_4$.

The protein product obtained in an amount of 60 g has a moisture content of 10% and comprises 82% by weight of protein, 4.2% by weight of lipids, and 20 g of chitin integuments.

What is claimed is:

1. A method for the processing of kriel to produce protein, lipids and chitin which comprises emulsification of lipids of kriel in an aqueous medium; separation of the resultant emulsion of lipids from the kriel mass; alkaline extraction of proteins from the kriel mass at a pH of 10 to 12; separation of the alkaline extract of proteins from chitin integuments; separation of protein from the alkaline extract.

2. A method as claimed in claim 1, wherein emulsification is carried out in the presence of mineral salts.

3. A method as claimed in claim 1, wherein emulsification is carried out at a pH of the medium of 4.5 to 5.0.